US012630372B2

(12) United States Patent
Yamaguchi et al.

(10) Patent No.: US 12,630,372 B2
(45) Date of Patent: May 19, 2026

(54) CONVEYOR

(71) Applicants: NGK INSULATORS, LTD., Nagoya (JP); NGK KILNTECH, CORPORATION, Nagoya (JP)

(72) Inventors: Minoru Yamaguchi, Nagoya (JP); Yoshimitsu Asano, Nagoya (JP); Takanori Isono, Nagoya (JP); Tomoaki Oyama, Nagoya (JP)

(73) Assignees: NGK INSULATORS, LTD., Nagoya (JP); NGK KILNTECH, CORPORATION, Nagoya (JP)

( * ) Notice: Subject to any disclaimer, the term of this patent is extended or adjusted under 35 U.S.C. 154(b) by 170 days.

(21) Appl. No.: 18/531,865

(22) Filed: Dec. 7, 2023

(65) Prior Publication Data

US 2024/0208746 A1     Jun. 27, 2024

(30) Foreign Application Priority Data

Dec. 23, 2022     (JP) ................................. 2022-206826

(51) Int. Cl.
B65G 47/90          (2006.01)
B65G 43/08          (2006.01)
F27B 9/39          (2006.01)

(52) U.S. Cl.
CPC ........... B65G 47/905 (2013.01); B65G 43/08 (2013.01); F27B 9/39 (2013.01); B65G 2203/044 (2013.01)

(58) Field of Classification Search
CPC . B65G 47/905; B65G 43/08; B65G 2203/044
(Continued)

(56) References Cited

U.S. PATENT DOCUMENTS 7,666,249 B2 *   2/2010   Bleifuss .................. C21B 11/08
                                                                  75/484

FOREIGN PATENT DOCUMENTS

DE     10 2009 004 967 B4     12/2010
JP          S60-191907 A          9/1985
(Continued)

OTHER PUBLICATIONS

DE102004035952 (Year: 2006).*
(Continued)

*Primary Examiner* — Gene O Crawford
*Assistant Examiner* — Lester Ill Rushin
(74) *Attorney, Agent, or Firm* — BURR PATENT LAW, PLLC

(57)          ABSTRACT

A conveyor may include: a first conveyor roller device; a second conveyor roller device disposed downstream of the first conveyor roller device; and a stopper disposed downstream of the first conveyor roller device and upstream of the second conveyor roller device and configured to prohibit a movement of the objects in the conveyance direction. The first conveyor roller device may be configured to increase the interval between the objects in the conveyance direction to be wider than the interval between the objects in the conveyance direction when the objects exit from the heat treatment furnace so that the objects are separated into object groups each including the predetermined number of objects or less. The stopper may be configured to be disposed between the object groups separated by the first conveyor roller device and adjacent to each other in the conveyance direction.

10 Claims, 9 Drawing Sheets

(58) Field of Classification Search
USPC ......................................................... 198/349
See application file for complete search history.

(56)                    References Cited

FOREIGN PATENT DOCUMENTS

| JP | S63-079310 U | 5/1988 |
| JP | 6948408 B2 | 10/2021 |
| JP | 6978622 B1 | 12/2021 |
| JP | 2022-151153 A | 10/2022 |

OTHER PUBLICATIONS

JP2001199522 (Year: 2001).*
CN109230351 (Year: 2019).*
JP2015108474 (2015) (Year: 2015).*
JPH0433807 (Year: 1992).*
JPS60191907 (reviewed on Espacenet) (Year: 1985).*
JP2022177220 (reviewed on Espacenet) (Year: 2022).*
JP2022151153 (reviewed on Espacenet) (Year: 2022).*
Japanese Office Action (with English translation) dated Aug. 26, 2025 (Application No. 2022-206826).
German Office Action (Application No. 10 2023 136 137.6) dated Jan. 9, 2026 (with English translation) (10 pages).

\* cited by examiner

CONVEYOR

REFERENCE TO RELATED APPLICATIONS

This application claims priority to Japanese Patent Application No. 2022-206826, filed on Dec. 23, 2022, the entire contents of which are hereby incorporated by reference into the present application.

TECHNICAL FIELD

The disclosure herewith relates to a conveyor configured to convey a plurality of objects.

BACKGROUND ART

Japanese U.S. Patent No. 6,978,622 describes a conveyor that coveys a plurality of objects. The objects are lined in a row direction perpendicular to a conveyance direction at a predetermined number, and are successively conveyed into a heat treatment furnace with a predetermined interval from one another in the conveyance direction. The objects conveyed into the heat treatment furnace are heat-treated in the heat treatment furnace. The conveyor conveys the heat-treated objects out of the heat treatment furnace. In this conveyor, a stopper is disposed on a conveyance passage. The objects conveyed out of the heat treatment furnace are aligned in a row along the row direction by coming into contact with the stopper.

DESCRIPTION

A plurality of conveying rollers disposed in the heat treatment furnace are rotatably supported at their opposite ends, and the objects are placed on intermediate portions thereof. Due to this, the conveying rollers rotate in a state where their intermediate portions are warped due to the weight of the objects. Due to this, even if the objects are conveyed into the heat treatment furnace with the objects lined along the row direction, a positional relationship in the conveyance direction of the objects lined in the row direction may be significantly disturbed by the time the objects reach an exit of the heat treatment furnace. In this case, even if the predetermined number of objects lined in the row direction are conveyed into the heat treatment furnace with the predetermined interval between each other in the conveyance direction, this predetermined interval in the conveyance direction is not maintained by the time the objects reach the exit of the heat treatment furnace. As a result, the interval between the objects that was conveyed first and the object conveyed thereafter may become narrow, and these objects may be conveyed as one group.

In such a case, if the objects are made to contact the stopper using the technique described in Japanese Patent No. 6,978,622, the objects lined in the conveyance direction collide with each other, and they enter a state of being a single cluster with no interval between each other. Due to this, an excessive number of objects are conveyed toward the downstream side at once, and such plurality of objects cannot be stably conveyed.

The disclosure herein discloses art to enable a plurality of objects to be stably conveyed even when a positional relationship of the objects in a conveyance direction is significantly disturbed.

In a first embodiment of the technology disclosed herein, a conveyor may be configured to successively convey a predetermined number of objects lined in a row direction perpendicular to a conveyance direction into a heat treatment furnace in a state where the objects are arranged at a predetermined interval from one another in the conveyance direction, and convey the objects heat-treated in the heat treatment furnace out of the heat treatment furnace. The conveyor may comprise: a first conveyor roller device configured to convey the objects conveyed out of the heat treatment furnace in the conveyance direction at a speed higher than an exiting speed at which the objects exit from the heat treatment furnace; a second conveyor roller device disposed downstream of the first conveyor roller device; and a stopper disposed downstream of the first conveyor roller device and upstream of the second conveyor roller device and configured to prohibit a movement of the objects in the conveyance direction. The first conveyor roller device may be configured to increase the interval between the objects in the conveyance direction to be wider than the interval between the objects in the conveyance direction when the objects exit from the heat treatment furnace so that the objects are separated into object groups each including the predetermined number of objects or less. The stopper may be configured to be disposed between the object groups separated by the first conveyor roller device and adjacent to each other in the conveyance direction.

According to the above configuration, when the objects exit from the heat treatment furnace in a state where their positional relationship in the conveyance direction is significantly disturbed, the objects firstly move on the first conveyor roller device. Due to the first conveyor roller device conveying the objects at the speed higher than the exiting speed at which the objects exit from the heat treatment furnace, the interval between the objects in the conveyance direction is widened. That is, the interval between the object that exited first and the object exited thereafter increases. Due to this, even if the object group that exited first is prohibited from moving in the conveyance direction by the stopper, it is possible to suppress elimination of the interval between the object group that exited first and the object group that exited thereafter. As a result, the object groups adjacent to each other in the conveyance direction can more easily be separated by the stopper, and the objects can stably be conveyed toward the second conveyor roller device.

Figure 6:
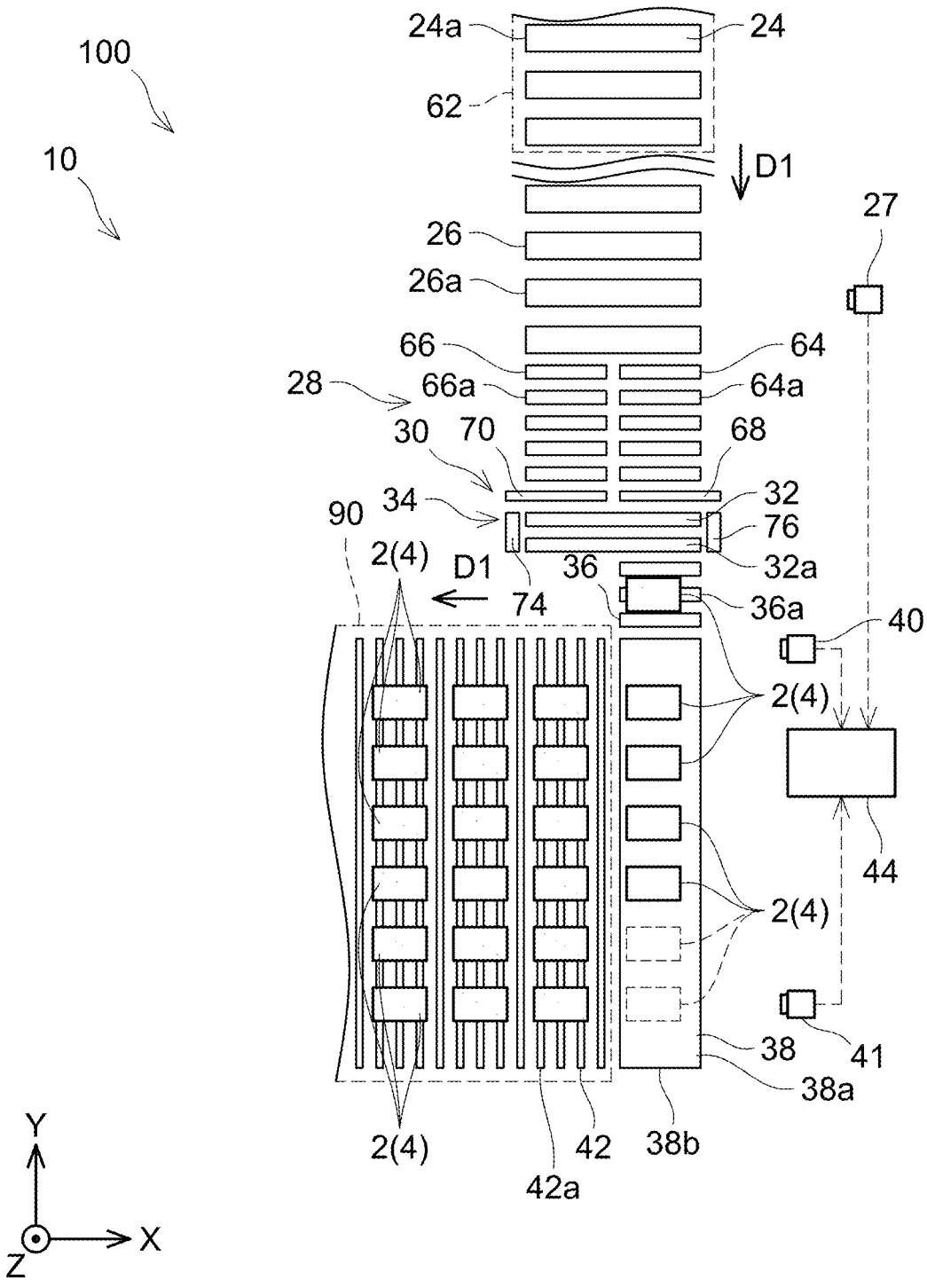

FIG. 6 is a schematic view of a replacement chamber conveyor roller device, a post-replacement chamber conveyor roller device, a second detector, a separating roller device, a second stopper, an alignment stage roller device, an aligning device, a second turning entrance device, a second turning device, a third detector, a fourth detector, a cooling conveyor roller device, and a control unit of the first embodiment.

Figure 7:
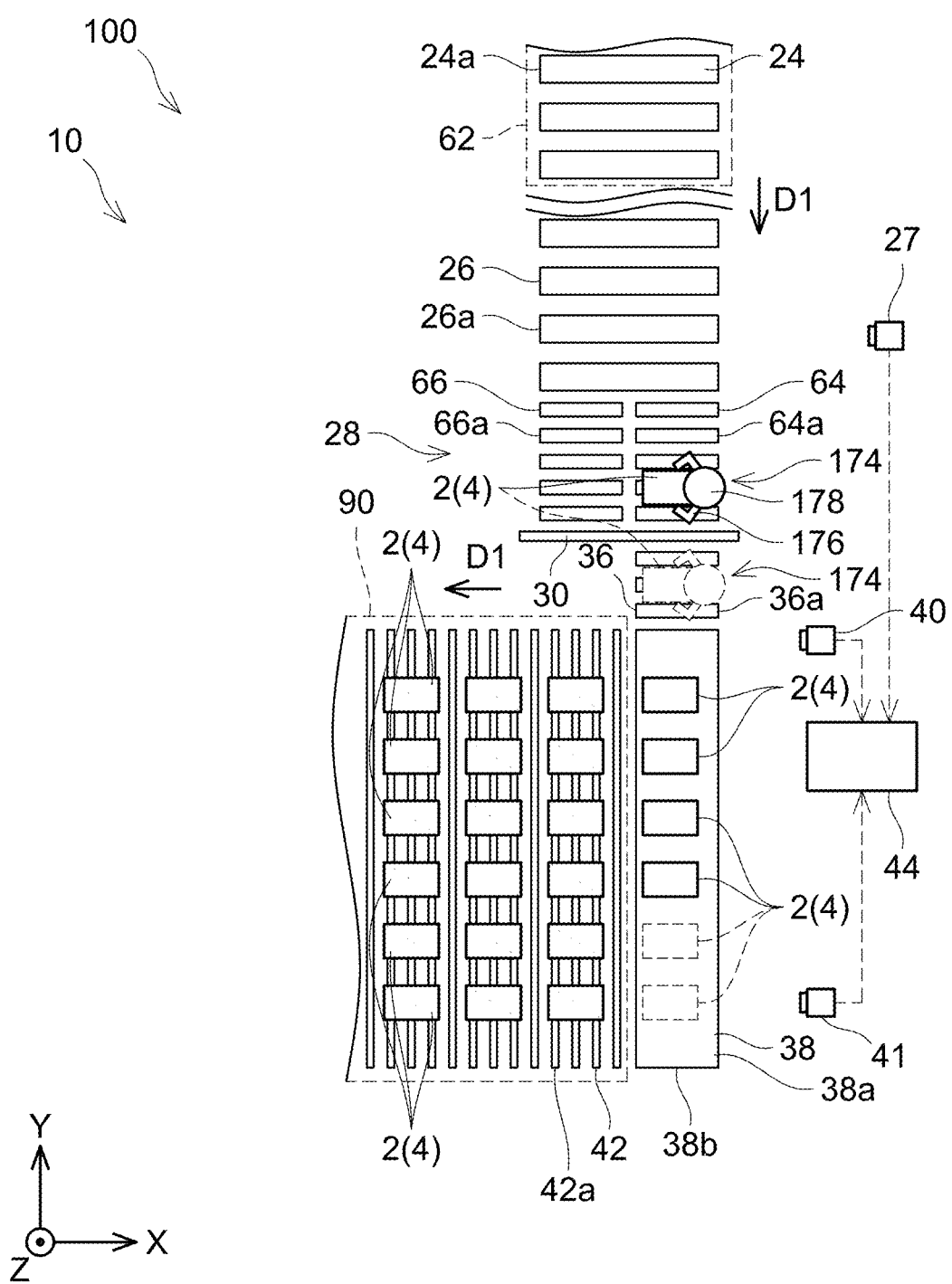

FIG. 7 is a schematic view of a replacement chamber conveyor roller device, a post-replacement chamber conveyor roller device, a second detector, a separating roller device, a second stopper, an aligning device, a second turning entrance device, a second turning device, a third detector, a fourth detector, a cooling conveyor roller device, and a control unit of a second embodiment.

Figure 8:
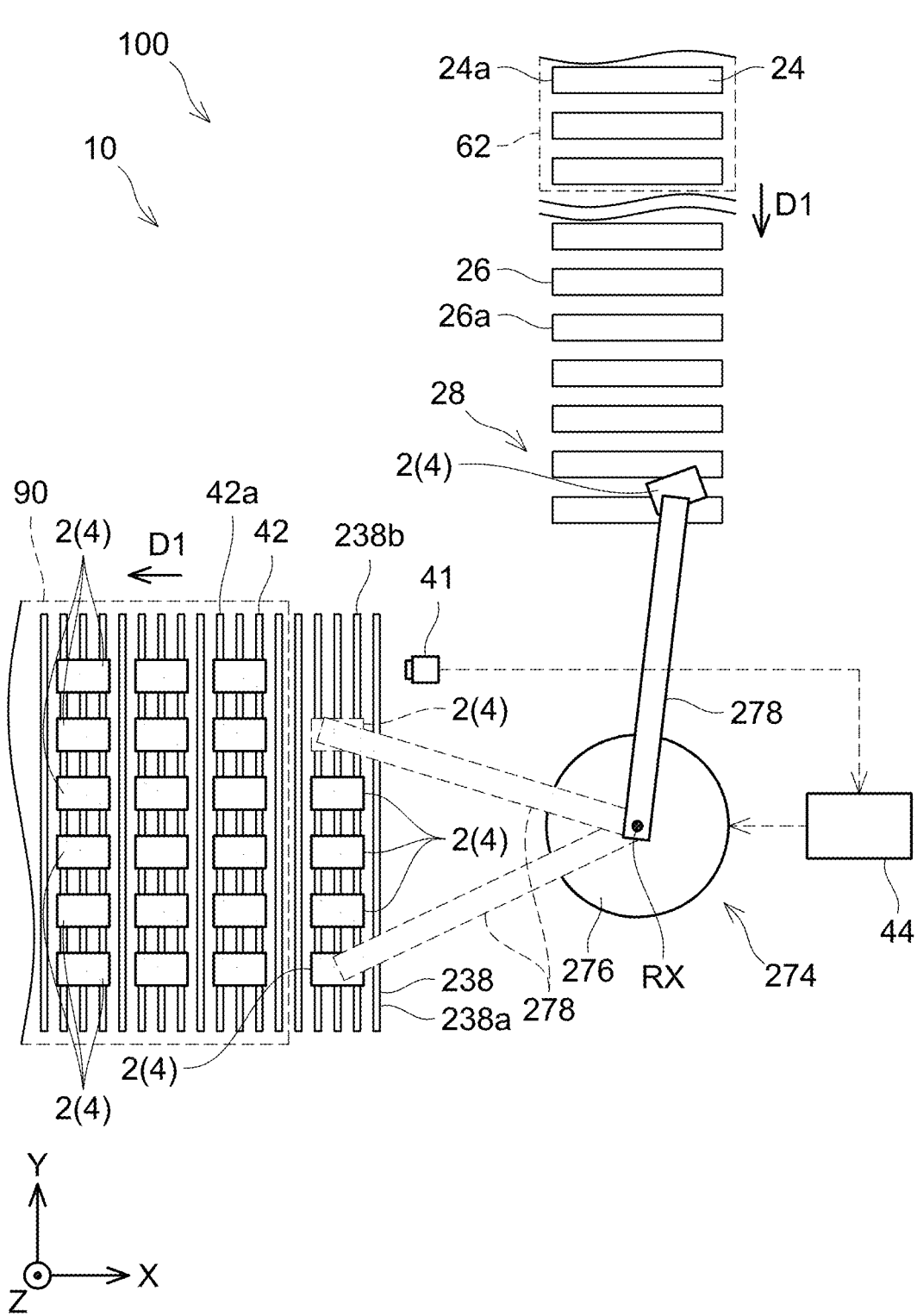

FIG. 8 is a schematic view of a replacement chamber conveyor roller device, a post-replacement chamber conveyor roller device, a separating roller device, an aligning device, a fourth detector, a cooling conveyor roller device entrance unit, a cooling conveyor roller device, and a control unit of a third embodiment.

Figure 9:
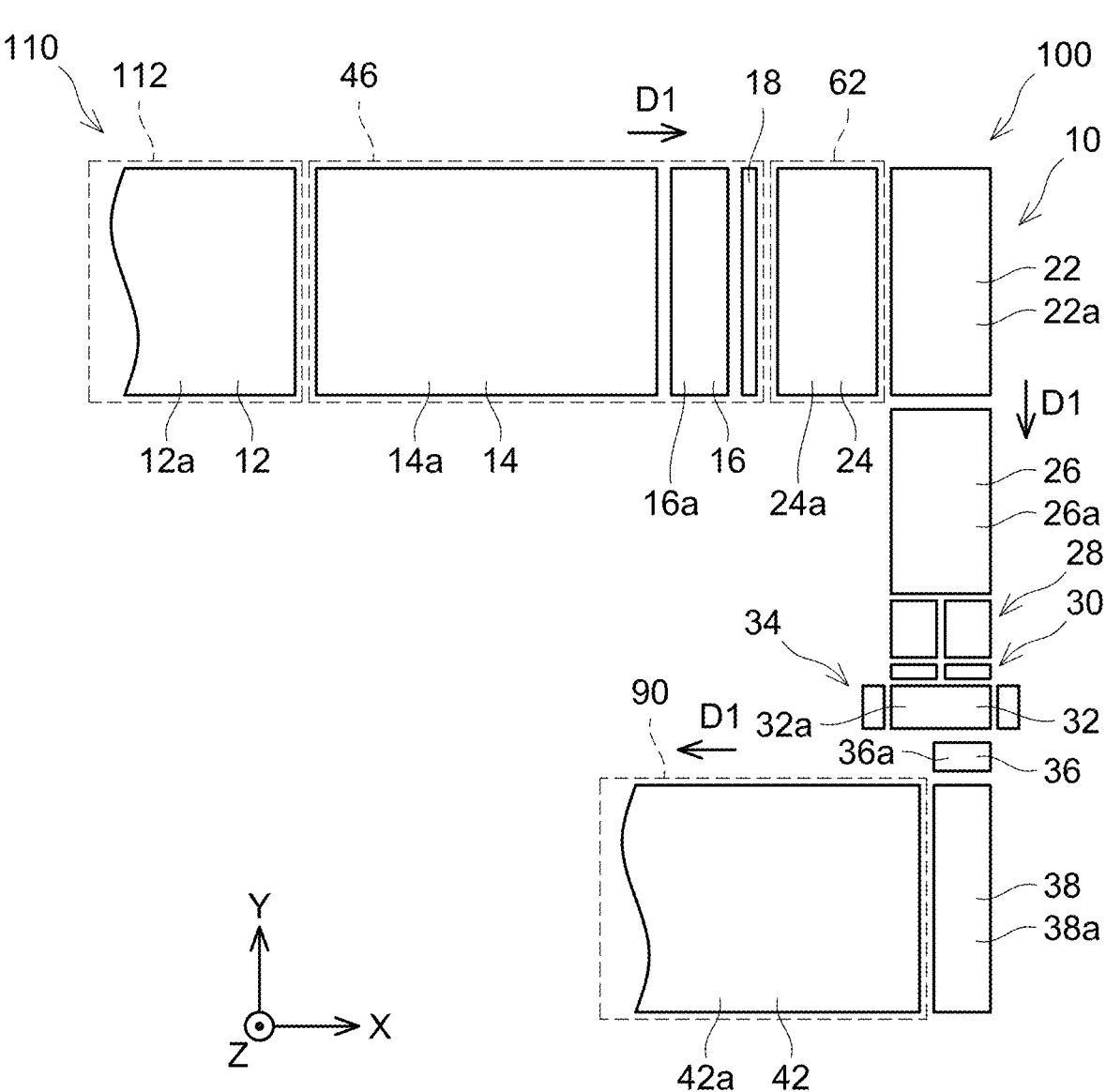

FIG. 9 is a schematic view of a heat treatment system of a fourth embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved heat treatment systems, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Some of the features characteristic to below-described embodiments will herein be listed. It should be noted that the respective technical elements are independent of one another, and are useful solely or in combinations. The combinations thereof are not limited to those described in the claims as originally filed.

In a second embodiment of the technology disclosed herein according to the first embodiment, the first conveyor roller device may comprise: a high-speed unit configured to convey the objects at a separating speed higher than the exiting speed; and a speed increasing unit configured to increase a conveyance speed of the objects from the exiting speed to the separating speed. According to the above configuration, the interval between the objects in the conveyance direction can stably be increased.

In a third embodiment of the technology disclosed herein according to the second embodiment, the speed increasing unit may comprise: a first speed increasing unit configured to convey the objects at a first speed higher than the exiting speed and lower than the separating speed; and a second speed increasing unit configured to convey the objects at a second speed higher than the first speed and lower than the separating speed. According to the above configuration, the interval between the objects in the conveyance direction can more stably be increased.

In a fourth embodiment of the technology disclosed herein according to the second or third embodiment, the conveyer may further comprise: a detector configured to detect an arrangement of the objects on the high-speed unit of the first conveyor roller device; and a control unit configured to classify the objects into a first object group and a second object group based on a detection result provided by the detector. The control unit may be configured to operate the stopper based on a classification result of the first object group and the second object group to dispose the stopper between the first object group and the second object group. According to the above configuration, when the stopper operates, a movement of one of the first and second object groups in the conveyance direction is prohibited by the stopper, while the other of the first and second object groups moves toward the downstream (in the conveyance direction) beyond the stopper. Due to this, the objects can be classified (separated) into the first object group and the second object group. Due to this, the first and second object groups can separately be conveyed in a stable manner toward the second conveyor roller device.

In a fifth embodiment of the technology disclosed herein according to the fourth embodiment, the detector may be a transmissive photoelectronic sensor configured to emit a laser beam in the row direction. According to the above configuration, the arrangement of the objects in the high-speed unit of the first conveyor roller device can be detected with a simple configuration.

In a sixth embodiment of the technology disclosed herein according to any one of the first to fifth embodiments, the first conveyor roller device may be disposed in a hood filled with atmospheric gas. The second conveyor roller device may be disposed in a replacement chamber which replaces the atmospheric gas with air. According to the above configuration, the objects can stably be conveyed toward the replacement chamber.

In a seventh embodiment of the technology disclosed herein according to any one of the first to sixth embodiments, the conveyer may comprise a first turning device disposed downstream of the stopper and configured to change the conveyance direction from a first direction to a second direction substantially perpendicular to the first direction. According to the above configuration, the conveyer can be suppressed from increasing in size in the first direction.

In an eighth embodiment of the technology disclosed herein according to the seventh embodiment, the first turning device may comprise a conveyance passage on which two objects can be arranged in the first direction and on which the objects are conveyed in the second direction. According to the above configuration, even if two objects are conveyed from the first conveyor roller device to the first turning device in a state of being adjacent to each other in the conveyance direction, these two objects lined in the conveyance direction can be suppressed from falling off the first turning device.

In a nineth embodiment of the technology disclosed herein according to the eighth embodiment, a width of the conveyance passage in the first direction may be equal to or less than three times a width of each of the objects in a longitudinal direction. According to the above configuration, two objects lined in the conveyance direction can be suppressed from falling off the conveyance passage of the first turning device while is it possible to suppress the first turning device from increasing in size in the first direction.

In a tenth embodiment of the technology disclosed herein according to any one of the seventh to nineth embodiments, the conveyer may further comprise a second turning device disposed downstream of the first turning device and configured to change the conveyance direction from the second direction to a third direction, the third direction being perpendicular to the second direction and opposite to the first direction; and an aligning device configured to align the objects in the second direction on a conveyance passage of the second turning device. According to the above configuration, the objects can be conveyed in the third direction with the objects aligned in the second direction.

First Embodiment

Figure 1:
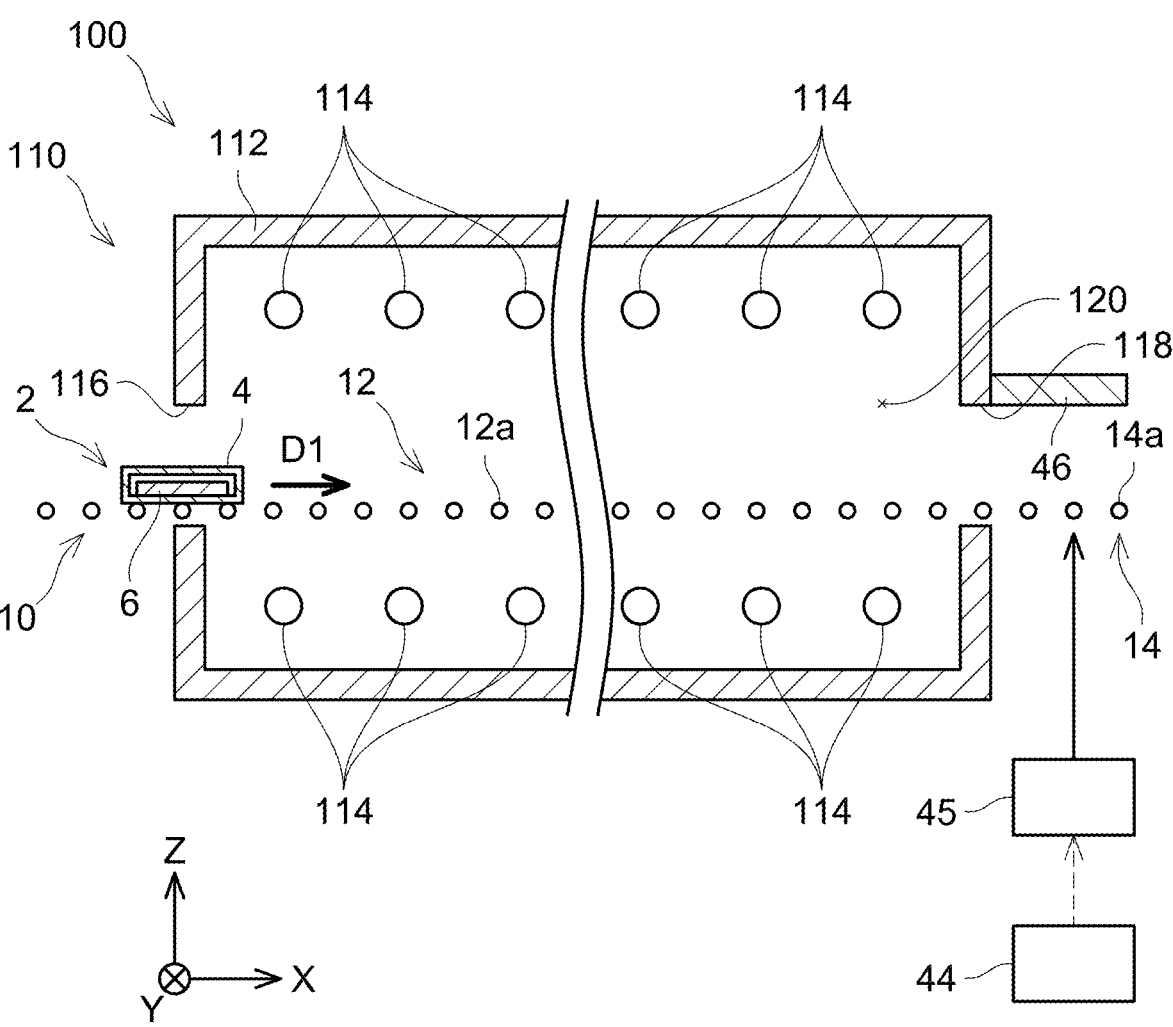
FIG. 1 is a schematic cross-sectional view of a conveyor and a heat treatment furnace of a first embodiment.

A conveyor 10 of a first embodiment shown in FIG. 1 is configured to convey a plurality of objects 2. The conveyor 10 is used in a heat treatment system 100 for subjecting the objects 2 to heat treatment. Firstly, the heat treatment system 100 will be described. The heat treatment system 100 comprises a heat treatment furnace 110 and the conveyor 10.

The heat treatment furnace 110 is configured to heat-treat object bodies 6 housed in a plurality of saggars 4. In this embodiment, a saggar 4 and an object body 6 are collectively termed an object 2. The saggars 4 have a substantially rectangular box shape. The object bodies 6 may each for example be a laminate of a ceramic dielectric body and an electrode, or positive and negative electrode materials of a lithium ion battery.

The heat treatment furnace 110 comprises a furnace body 112 and a plurality of heaters 114. The furnace body 112 has a substantially cuboid shape extending in an X direction. The furnace body 112 has an entrance 116 disposed at one end of the furnace body 112 and an exit 118 disposed at another end of the furnace body 112. Further, the furnace body 112 defines a heat treatment space 120 therein. The heat treatment space 120 is filled with atmospheric gas. The atmospheric gas may for example be oxygen gas or inert gas (such as nitrogen gas). The heat treatment space 120 is in communication with a space outside the furnace body 112 via the entrance 116 and the exit 118. The objects 2 are conveyed by the conveyor 10 and moves inside the heat treatment space 120 in a conveyance direction D1.

The heaters 114 are disposed in the heat treatment space 120. The heaters 114 are lined along the X direction with a substantially regular interval between one another. The heaters 114 are configured to heat the heat treatment space 120 by generating heat. Due to this, the objects 2 (more specifically, the object bodies 6 housed in the saggars 4) are heat-treated while they move inside the heat treatment space 120.

Figure 2:
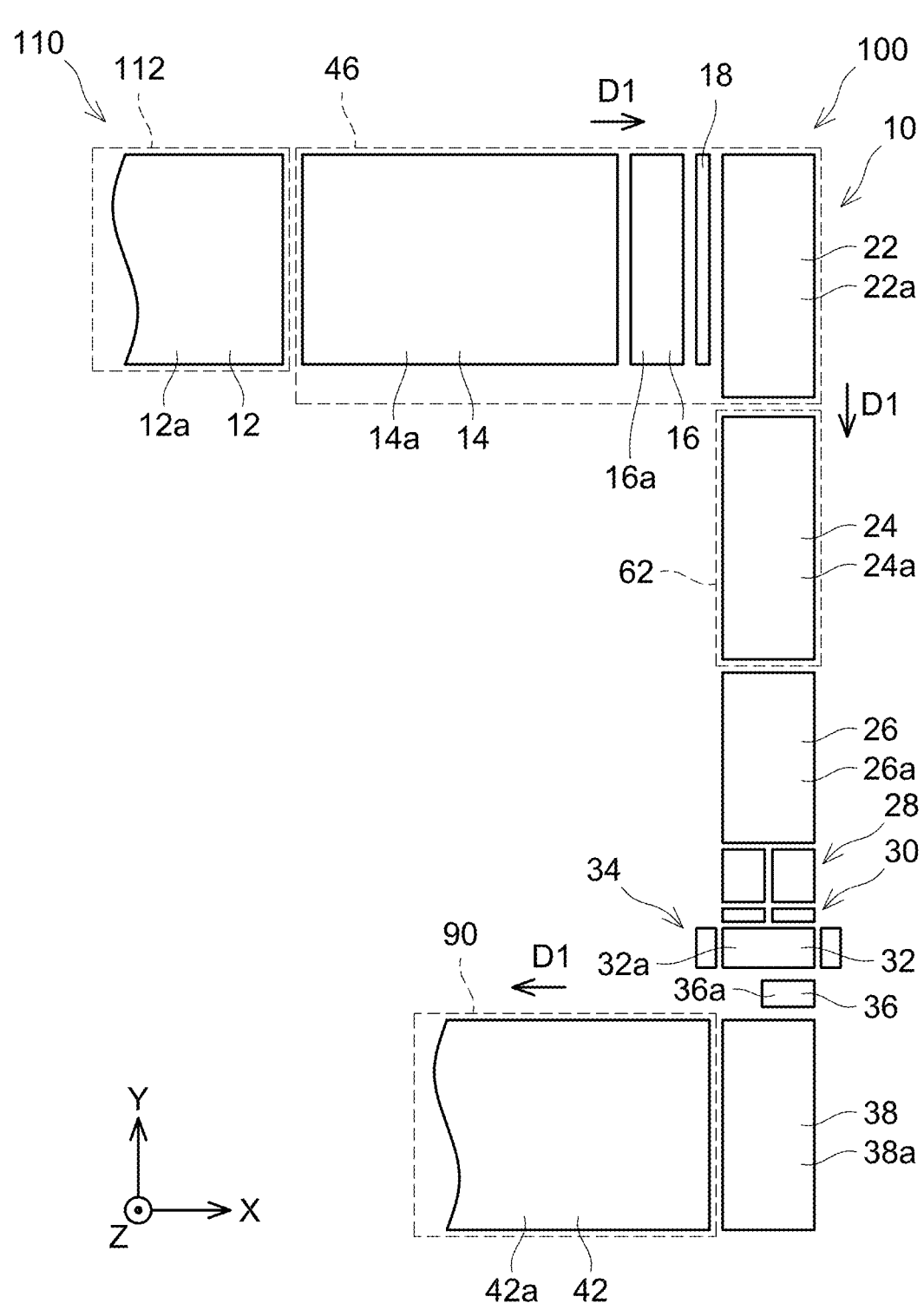
FIG. 2 is a schematic view of a heat treatment system of the first embodiment.

As shown in FIG. 2, the conveyor 10 includes a heat treatment conveyor roller device 12, a separating conveyor roller device 14, a pre-stopper conveyor roller device 16, a first stopper 18, a first detector 20 (see FIG. 4), a first turning device 22, a replacement chamber conveyor roller device 24, a post-replacement chamber conveyor roller device 26, a second detector 27 (see FIG. 6), a separating roller device 28, a second stopper 30, an alignment stage roller device 32, an aligning device 34, a second turning entrance device 36, a second turning device 38, a third detector 40 (see FIG. 6), a fourth detector 41 (see FIG. 6), a cooling conveyor roller device 42, and a control unit 44 (see FIG. 1). The control unit 44 is configured to control operations of the heat treatment conveyor roller device 12, the separating conveyor roller device 14, the pre-stopper conveyor roller device 16, the first turning device 22, the replacement chamber conveyor roller device 24, the post-replacement chamber conveyor roller device 26, the separating roller device 28, the alignment stage roller device 32, the second turning entrance device 36, the second turning device 38, and the cooling conveyor roller device 42 by controlling a driver device 45 (see FIG. 1).

Figure 3:
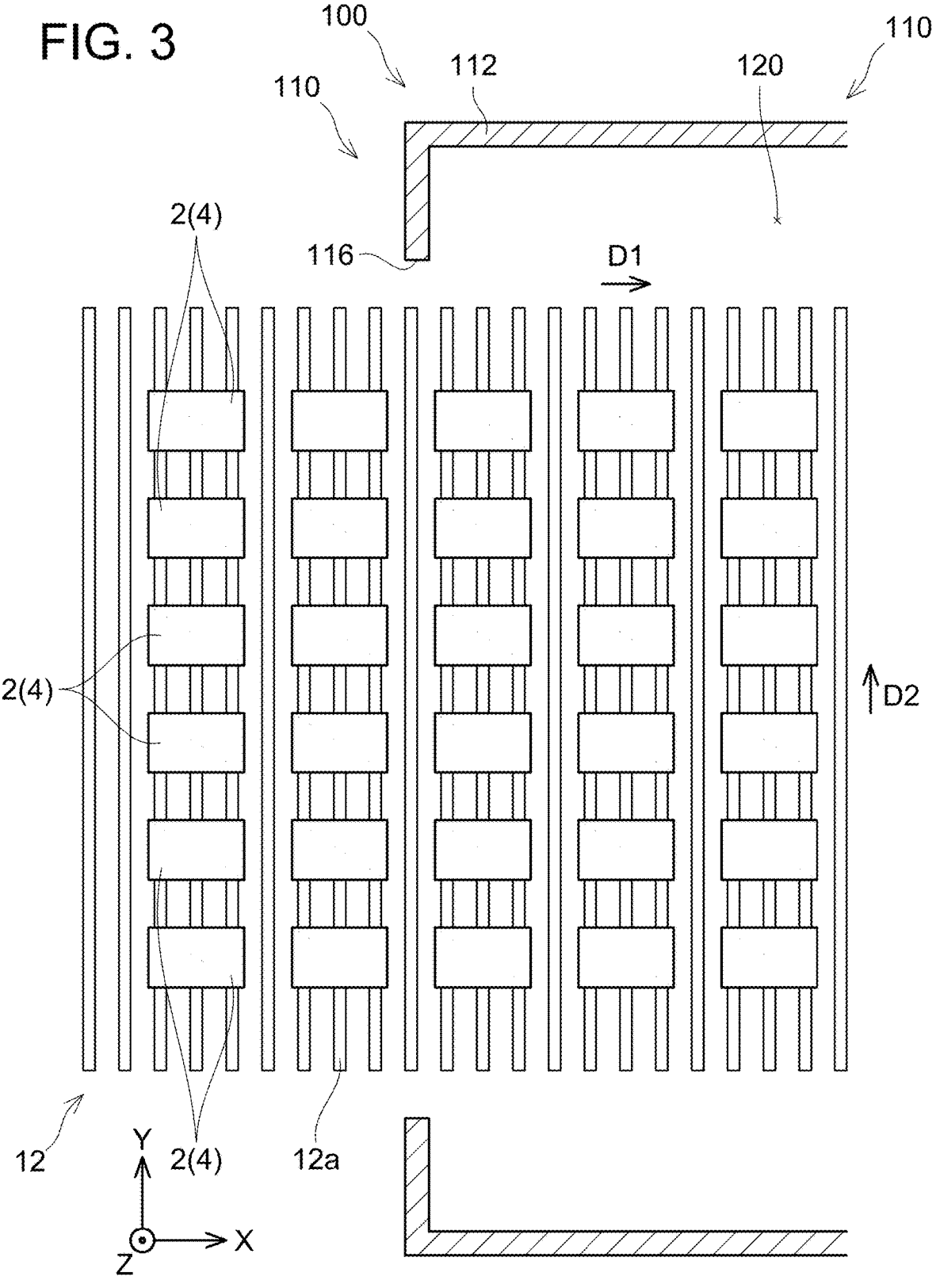
FIG. 3 is a schematic cross-sectional view of the heat treatment system near an entrance of the heat treatment furnace of the first embodiment.

As shown in FIGS. 1 and 3, the heat treatment conveyor roller device 12 extends from the vicinity of the entrance 116 of the furnace body 112 to the vicinity of the exit 118 of the furnace body 112 through the heat treatment space 120. The heat treatment conveyor roller device 12 comprises a plurality of rollers of which ends are rotatably supported. The objects 2 are conveyed by the rotating rollers, and moves on a conveyance passage 12a of the heat treatment conveyor roller device 12 from the entrance 116 toward the exit 118. In doing so, the objects 2 are successively conveyed into the heat treatment space 120 from the entrance 116 with the objects 2 lined in the conveyance direction D1 at a predetermined interval from one another. When the objects 2 move on the conveyance passage 12a, the conveyance direction D1 substantially matches a +X direction. Further, the objects 2 are conveyed into the heat treatment space 120 from the entrance 116 with a predetermined number of (which is six in this embodiment) objects 2 lined along a row direction D2 on the conveyance passage 12a. The row direction D2 is substantially perpendicular to the conveyance direction D1, and substantially matches a Y direction when the objects 2 move on the conveyance passage 12a. The objects 2 are placed on the center portion of the conveyance passage 12a in the row direction D2. The objects 2 that have been conveyed into the heat treatment space 120 move inside the heat treatment space 120 in the conveyance direction D1, and exit from the heat treatment space 120 through the exit 118.

As shown in FIG. 2, the separating conveyor roller device 14 is disposed downstream of the heat treatment conveyor roller device 12 in the conveyance direction D1. The separating conveyor roller device 14 extends in the X direction. The separating conveyor roller device 14 is disposed in a hood 46 together with the pre-stopper conveyor roller device 16, the first stopper 18, the first detector 20 (see FIG. 4), and the first turning device 22. In FIG. 2, the hood 46 is indicated by a broken line. Atmospheric gas is filled in the hood 46. The atmospheric gas may for example be oxygen gas or inert gas (such as nitrogen gas). The atmospheric gas in the hood 46 is same as the atmospheric gas in the furnace body 112.

Figure 4:
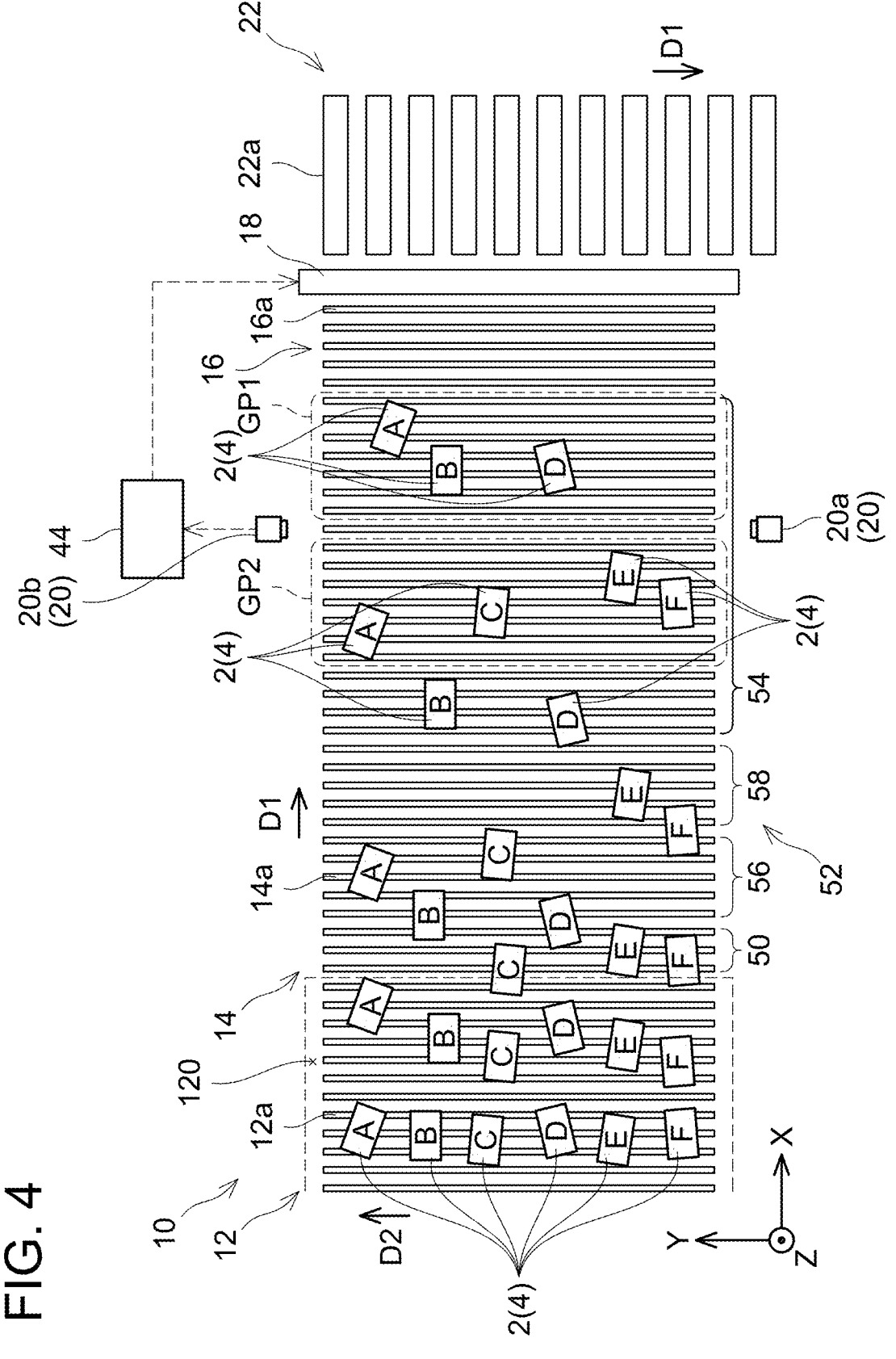
FIG. 4 is a schematic view of a heat treatment conveyor roller device, a separating conveyor roller device, a first stopper, a first detector, a first turning device, and a control unit of the first embodiment.

As shown in FIG. 4, the separating conveyor roller device 14 comprises a plurality of rollers of which ends are rotatably supported. The objects 2 are conveyed by the rotating rollers, and move on a conveyance passage 14a of the separating conveyor roller device 14 in the conveyance direction D1. When the objects 2 move on the conveyance passage 14a, the conveyance direction D1 substantially matches the +X direction. In FIG. 4, the six objects 2 that were lined in the row direction D2 upon being conveyed into the heat treatment furnace 110 are given reference signs A, B, C, D, E, F in this order from the object 2 on one end toward the one on the other end. The separating conveyor roller device 14 comprises a low-speed unit 50, a speed increasing unit 52, and a high-speed unit 54. The low-speed unit 50, the speed increasing unit 52, and the high-speed unit 54 are disposed in this order from the upstream side toward the downstream side.

A plurality of rollers of the low-speed unit 50 rotates at a substantially same speed as a rotating speed of the rollers of the heat treatment conveyor roller device 12. Due to this, the low-speed unit 50 conveys the objects 2 at a substantially same conveyance speed as an exiting speed of the objects 2 exiting from the heat treatment furnace 110.

The speed increasing unit 52 increases the conveyance speed of the objects 2 in multiple steps. The speed increasing unit 52 comprises a first speed increasing unit 56 and a second speed increasing unit 58. The first speed increasing unit 56 and the second speed increasing unit 58 are disposed in this order from the upstream side toward the downstream side. A plurality of rollers of the first speed increasing unit 56 rotates at a higher speed than the rotating speed of the rollers of the low-speed unit 50. Due to this, the first speed increasing unit 56 conveys the objects 2 at a first speed that is higher than the conveyance speed of the low-speed unit 50. The first speed is greater than 1 time the conveyance speed of the low-speed unit 50 but equal to or less than 10 times this conveyance speed, and is preferably equal to or greater than 2 times the conveyance speed but equal to or less than 4 times the conveyance speed. A plurality of rollers of the second speed increasing unit 58 rotates at a speed higher than the rotating speed of the rollers of the first speed increasing unit 56. Due to this, the second speed increasing unit 58 conveys the objects 2 at a second speed that is higher than the first speed of the first speed increasing unit 56. The second speed is equal to or greater than 3 times the conveyance speed of the low-speed unit 50 but equal to or less than 30 times this conveyance speed, and is preferably equal to or greater than 5 times but equal to or less than 20 times the conveyance speed of the low-speed unit 50.

A plurality of rollers of the high-speed unit 54 rotates at a speed higher than the rotating speed of the second speed increasing unit 58. Due to this, the high-speed unit 54 conveys the objects 2 at a separating speed that is higher than the second speed of the second speed increasing unit 58. The separating speed is equal to or greater than 3 times the conveyance speed of the low-speed unit 50 but equal to or less than 30 times this conveyance speed, and is preferably equal to or greater than 10 times but equal to or less than 30 times the conveyance speed of the low-speed unit 50. A length of the high-speed unit 54 in the conveyance direction D1 is longer than a total of lengths of the low-speed unit 50 and the speed increasing unit 52 in the conveyance direction D1. When the objects 2 move through the separating conveyor roller device 14, the interval between the objects 2 in the conveyance direction D1, such as the interval between the object 2 having the reference sign A in a front row (object 2 that was conveyed first) and the object 2 having the reference sign A in a rear row (object 2 that was conveyed thereafter) increases than the interval that was present at the time of entering into the entrance 116 of the heat treatment furnace 110. That is, when the object 2 having the reference sign A in the front row reaches the speed increasing unit 52 first and begins to be conveyed in the speed increasing unit 52, the object 2 having the reference sign A in the rear row is still being conveyed by the low-speed unit 50. As a result, the interval between the objects 2 increases. Further, similarly, the interval in the conveyance direction D1 between the objects 2 that are adjacent in the Y direction, such as the interval in the conveyance direction D1 between the object 2 having the reference sign A and the object 2 having the reference sign B, increases than the interval that was present between them at the time of exiting from the exit 118 of the heat treatment furnace 110. Due to this, the objects 2 are separated into object groups lined along the conveyance direction D1. Since the conveyance speed of the objects 2 is gradually increased by the first speed increasing unit 56, the second speed increasing unit 58, and the high-speed unit 54, occurrence of slipping between the objects 2 and the rollers is suppressed, and the conveyance speed of the objects 2 can stably be increased.

The pre-stopper conveyor roller device 16 is disposed downstream of the separating conveyor roller device 14. The pre-stopper conveyor roller device 16 comprises a plurality of rollers of which ends are rotatably supported. The objects 2 are conveyed by the rotating rollers, and move on a conveyance passage 16a of the pre-stopper conveyor roller device 16 in the conveyance direction D1. When the objects 2 move on the conveyance passage 16a, the conveyance direction D1 substantially matches the +X direction. The rollers of the pre-stopper conveyor roller device 16 rotate at the same speed as the rotating speed of the rollers of the high-speed unit 54. Due to this, the pre-stopper conveyor roller device 16 conveys the objects 2 at the separating speed.

The first stopper 18 is disposed downstream of the pre-stopper conveyor roller device 16 and upstream of the first turning device 22. The first stopper 18 has a flat plate shape extending in a width direction of the conveyance passage 16a of the pre-stopper conveyor roller device 16 (Y direction). In the Y direction, the length of the first stopper 18 is longer than the length of the pre-stopper conveyor roller device 16. The first stopper 18 moves in a +Z direction and a −Z direction between a pass-through prohibiting position and a pass-through permitting position. When the first stopper 18 is located at the pass-through prohibiting position, the first stopper 18 is arranged to close a path between the pre-stopper conveyor roller device 16 and the first turning device 22 in the conveyance direction D1. Due to this, the objects 2 contact the first stopper 18 upon passing through the conveyance passage 16a of the pre-stopper conveyor roller device 16, by which they stay on the conveyance passage 16a and cannot move from the pre-stopper conveyor roller device 16 into the first turning device 22. That is, the first stopper 18 is disposed between the object groups that are adjacent along the conveyance direction D1. In this state, the interval in the conveyance direction D1 between the objects 2 that are prohibited from moving by the first stopper 18 on the upstream side of the first stopper 18 and the objects 2 that are being conveyed on the upstream side of those objects 2 becomes smaller. On the other hand, when the first stopper 18 is located at the pass-through permitting position, the first stopper 18 is arranged separated from both the pre-stopper conveyor roller device 16 and the first turning device 22 in the −Z direction. In this state, the first stopper 18 does not close the path between the pre-stopper conveyor roller device 16 and the first turning device 22 in the conveyance direction D1. Due to this, the objects 2 that were prohibited by the first stopper 18 from moving can move to the first turning device 22, and the objects 2 conveyed in the pre-stopper conveyor roller device 16 can move from the pre-stopper conveyor roller device 16 into the first turning device 22 without coming into contact with the first stopper 18.

The first detector 20 is disposed such that the high-speed unit 54 is interposed between components of the first detector 20 in the width direction of the conveyance passage 14a of the separating conveyor roller device 14 (Y direction). The first detector 20 is configured to detect arrangements of the objects 2 in the high-speed unit 54. The first detector 20 may for example be a transmissive photoelectronic sensor configured to emit a laser beam in the Y direction. In a variant, the first detector 20 is not limited to the transmissive photoelectronic sensor, but may be a position sensor, a CCD sensor, or a CMOS sensor, for example. When the first detector 20 is the transmissive photoelectronic sensor, the first detector 20 comprises a light emitter 20*a* and a light receiver 20*b*. The light emitter 20*a* is controlled by the control unit 44 to emit a laser beam in the +Y direction. When the objects 2 are located between the light emitter 20*a* and the light receiver 20*b*, the light receiver 20*b* cannot receive the laser beam emitted from the light emitter 20*a*. On the other hand, when the objects 2 are not located between the light emitter 20*a* and the light receiver 20*b*, the light receiver 20*b* can receive the laser beam emitted from the light emitter 20*a*. A detection result of the laser beam in the light receiver 20*b* is sent to the control unit 44.

Before explaining the details of the first turning device 22, a flow of conveying the objects 2 to the first turning device 22 will be described. As shown in FIG. 1, the objects 2 are conveyed from the entrance 116 of the furnace body 112 into the heat treatment space 120, and are conveyed out to the separating conveyor roller device 14 from the exit 118 of the furnace body 112. While the objects 2 move on the rollers of the heat treatment conveyor roller device 12 in the heat treatment space 120, the objects 2 lined in the row direction D2 might be conveyed at different conveyance speeds, or the objects 2 may not move linearly as they move due to the warpage in the rollers. Due to this, despite the six objects 2 having the reference signs A, B, C, D, E, and F having been arranged in a row along the row direction D2 (Y direction) before being conveyed into the heat treatment space 120, after they are conveyed out of the heat treatment space 120, they may not be arranged in a row along the row direction D2 (Y direction) as shown in FIG. 4. That is, after having been conveyed out of the heat treatment space 120, the interval between the six objects 2 with the reference signs A, B, C, D, E, and F in the conveyance direction D1 becomes wider than the interval in the conveyance direction D1 that was present between those six objects prior to being conveyed into the heat treatment space 120, thus the positional relationship of the six objects 2 having the reference signs A, B, C, D, E, and F in the conveyance direction D1 is disturbed. Further, the interval between the six objects 2 in the front row and the six objects 2 in the rear row in the conveyance direction D1 may change before the objects 2 are conveyed into and after the objects 2 are conveyed out of the heat treatment space 120. Further, due to the objects 2 not moving linearly, the interval between the objects 2 in the row direction D2 may change, and the postures of the objects 2 may change between before the objects 2 are conveyed into and after the objects 2 are conveyed out of the heat treatment space 120.

The six objects 2 move on the conveyance passage 14*a* sequentially through the low-speed unit 50, the first speed increasing unit 56, the second speed increasing unit 58, and the high-speed unit 54 in this order in the state where the interval between the six objects 2 is widened in the conveyance direction D1. Since the conveyance speed becomes faster in the first speed increasing unit 56, in the second speed increasing unit 58, and in the high-speed unit 54 in this order, the interval between the six objects 2 in the conveyance direction D1 increases even more as the six objects 2 move through the first speed increasing unit 56, the second speed increasing unit 58, and the high-speed unit 54 in this order. Further, the interval between two objects 2 adjacent in the conveyance direction D1, such as the object 2 having the reference sign A in the front row and the object 2 having the reference sign A in the rear row is widened. Due to this, the interval between the six objects 2 in the conveyance direction D1 and the interval between the six objects 2 in one row and the six objects 2 in another row arranged in the conveyance direction D1 can stably be increased.

The objects 2 pass between the light emitter 20*a* and the light receiver 20*b* on the high-speed unit 54. In this case, if the laser beam emitted from the light emitter 20*a* is interrupted by the objects 2, the light receiver 20*b* does not receive the laser beam. As such, when the laser beam is received by the light receiver 20*b*, this means that an interval is formed between the objects 2 conveyed downstream of the first detector 20 and the objects 2 conveyed upstream of the first detector 20. Further, by measuring a period of time during which the laser beam is not received by the light receiver 20*b*, the interval (distance) between the objects 2 located upstream of the first detector 20 and the objects 2 located downstream of the first detector 20 can be measured. The control unit 44 can detect the arrangement of the objects 2 in the high-speed unit 54 by determining whether the light receiver 20*b* is not receiving the laser beam, and the objects 2 conveyed in the high-speed unit 54 can be classified (separated) into object groups (mass of objects 2) each constituted of a predetermined number of objects 2 or less (such as six or less). This will be described using the arrangement of the objects 2 shown in FIG. 4 as an example.

Firstly, the object 2 having the reference sign A, the object 2 having the reference sign B, and the object 2 having the reference sign D move through between the light emitter 20*a* and the light receiver 20*b* in the conveyance direction D1. Since the objects 2 having the reference signs A, B, D at least partially overlap in the Y direction, the laser beam is interrupted by the objects 2 while the objects 2 having the reference signs A, B, D are moving between the light emitter 20*a* and the light receiver 20*b*, thus is not received by the light receiver 20*b*. When the object 2 having the reference sign D passes the light emitter 20*a* and the light receiver 20*b*, then the object 2 having the reference sign E moves between the light emitter 20*a* and the light receiver 20*b* in the conveyance direction D1. Since the objects 2 having the reference signs D, E do not overlap in the Y direction, the laser beam is not interrupted by the objects 2 and is received by the light receiver 20*b* after the object 2 having the reference sign D has passed beyond the light emitter 20*a* and the light receiver 20*b* until the object 2 having the reference sign E moves in between the light emitter 20*a* and the light receiver 20*b*. When the control unit 44 detects that the laser beam is received by the light receiver 20*b*, it classifies the objects 2 that passed between the light emitter 20*a* and the light receiver 20*b* while the laser beam was not received by the light receiver 20*b* (that is, the objects 2 having the reference signs A, B, D) as a first object group GP1. The number of the objects 2 in the first object group GP1 is less than the number of objects 2 lined in the row direction D2 before the objects 2 are conveyed into the heat treatment space 120 (that is, six).

When the object 2 having the reference sign E moves through between the light emitter 20*a* and the light receiver 20*b*, the object 2 having the reference sign F and the object 2 having the reference sign C move between the light emitter 20*a* and the light receiver 20*b* in the conveyance direction D1 sequentially in this order. Further, the object 2 having the reference sign A in the rear row also moves between the light emitter 20*a* and the light receiver 20*b* in the conveyance direction D1. Since the objects 2 having the reference signs E, F, C, A at least partially overlap in the Y direction, the laser beam is interrupted by the objects 2 while the objects 2 having the reference signs E, F, C, A are moving between the light emitter 20*a* and the light receiver 20*b*, thus is not received by the light receiver 20b. When the object 2 having the reference sign A in the rear row moves past the light emitter 20a and the light receiver 20b, the object 2 having the reference sign B in the rear row moves between the light emitter 20a and the light receiver 20b in the conveyance direction D1. Since the objects 2 having the reference signs A, B in the rear row do not overlap in the Y direction, the laser beam is not interrupted by the objects 2 and is received by the light receiver 20b after the object 2 having the reference sign A in the rear row has passed beyond the light emitter 20a and the light receiver 20b until the object 2 having the reference sign B in the rear row moves in between the light emitter 20a and the light receiver 20b. When the control unit 44 detects that the laser beam is received by the light receiver 20b, it classifies the objects 2 that passed between the light emitter 20a and the light receiver 20b while the laser beam was not received by the light receiver 20b (that is, the objects 2 having the reference signs E, F, C and the object 2 having the reference sign A in the rear row) as a second object group GP2. The number of the objects 2 in the second object group GP2 is less than the number of objects 2 lined in the row direction D2 before the objects 2 are conveyed into the heat treatment space 120. The control unit 44 executes the above processes sequentially while the conveyor 10 is operating.

When the first object group GP1 reaches the pre-stopper conveyor roller device 16, the control unit 44 moves the first stopper 18 from the pass-through prohibiting position to the pass-through permitting position. Due to this, the first object group GP1 moves from the pre-stopper conveyor roller device 16 to the first turning device 22, and moves on the first turning device 22. When the control unit 44 determines that the first object group GP1 has moved to the first turning device 22 (such as by a detection device that is not shown), it moves the first stopper 18 from the pass-through permitting position to the pass-through prohibiting position. Due to this, the first stopper 18 comes to be arranged between the separate first object group GP1 and the adjacent second object group GP2. Due to this, the second object group GP2 cannot move from the pre-stopper conveyor roller device 16 to the first turning device 22. While the first stopper 18 is in the pass-through permitting position, the control unit 44 stops the rollers of the low-speed unit 50, the rollers of the first speed increasing unit 56, the rollers of the second speed increasing unit 58, and the rollers of the high-speed unit 54. When the control unit 44 determines that the first object group GP1 has moved past the first turning device 22 (such as when it determines that a predetermined time has elapsed since the first stopper 18 was moved to the pass-through prohibiting position), it moves the first stopper 18 from the pass-through prohibiting position to the pass-through permitting position. Due to this, the second object group GP2 moves from the pre-stopper conveyor roller device 16 to the first turning device 22, and moves on the first turning device 22. Due to this, the first object group GP1 and the second object group GP2 are separately and stably conveyed to the first turning device 22.

Next, the case where the six objects 2 having the reference signs A, B, C, D, E, and F are still arranged in a row in the row direction D2 (Y direction) even after having been conveyed out of the heat treatment space 120 will be described. In this case, the six objects 2 having the reference signs A, B, C, D, E, and F are still arranged in a row in the row direction D2 after having moved on the conveyance passage 14a through the low-speed unit 50, the first speed increasing unit 56, the second speed increasing unit 58, and the high-speed unit 54. Due to this, the six objects 2 having the reference signs A, B, C, D, E, and F move substantially simultaneously between the light emitter 20a and the light receiver 20b. As a result, the control unit 44 classifies the six objects 2 having the reference signs A, B, C, D, E, and F into the first object group GP1. Further, the control unit 44 classifies the six objects 2 having the reference signs A, B, C, D, E, and F in the rear row into the second object group GP2. The number of objects 2 in the first object group GP1 and the number of objects 2 in the second object group GP2 are both same as the number of the objects 2 lined in the row direction D2 before being conveyed into the heat treatment space 120 (that is, six). After this, the first object group GP1 and the second object group GP2 sequentially move from the pre-stopper conveyor roller device 16 to the first turning device 22.

Next, the first turning device 22 will be described. The first turning device 22 is disposed downstream of the first stopper 18. The first turning device 22 changes the conveyance direction D1 of the objects 2 from the +X direction to the −Y direction that is perpendicular to the X direction. Due to this, the conveyor 10 can be suppressed from increasing in size in the X direction. Further, the first turning device 22 comprises a plurality of first rollers of which ends are rotatably supported, and a plurality of second rollers of which ends are rotatably supported. The objects 2 are conveyed by the rotating first rollers and move on the conveyance passage 22a in the +X direction, and also are conveyed by the rotating second rollers and move on the conveyance passage 22a of the first turning device 22 in the conveyance direction D1 (−Y direction).

Figure 5:
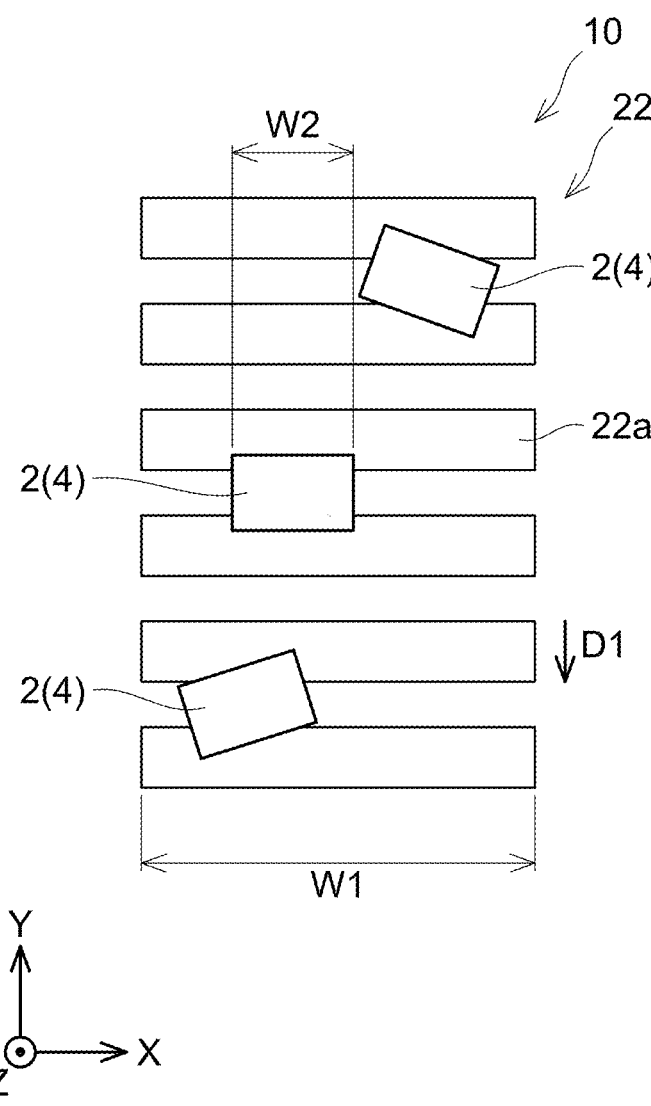
FIG. 5 is a schematic view of a first turning device of the first embodiment.

As shown in FIG. 5, in the width direction of the conveyance passage 22a (X direction) perpendicular to the conveyance direction D1, the width W1 of the conveyance passage 22a is equal to or greater than 2 times the width W2 of each of the objects 2 in the longitudinal direction and equal to or less than 3 times the width W2. Due to this, when a longitudinal axis of the object 2 is tilted relative to the width direction of the conveyance passage 22a, such as when the inclination angle is 45 degrees and two objects 2 move to the conveyance passage 22a with two the objects 2 lined in the conveyance direction D1 (X direction), the two objects 2 can be arranged on the conveyance passage 22a so as to be lined in the X direction, and do not fall off the conveyance passage 22a. Further, the width W1 of the conveyance passage 22a is greater than the width of the pre-stopper conveyor roller device 16 in the X direction.

As shown in FIG. 2, the replacement chamber conveyor roller device 24 is disposed downstream of the first turning device 22. The replacement chamber conveyor roller device 24 extends in the Y direction. The replacement chamber conveyor roller device 24 comprises rollers of which ends are rotatably supported (see FIG. 6). The objects 2 are conveyed by the rotating rollers, and move on the conveyance passage 24a of the replacement chamber conveyor roller device 24 in the conveyance direction D1 (−Y direction). Further, the replacement chamber conveyor roller device 24 conveys the objects 2 at the same speed as the conveyance speed at which the objects 2 are conveyed by the first turning device 22. The width of the conveyance passage 24a (dimension in the X direction) is substantially the same as the width W1 of the conveyance passage 22a of the first turning device 22. Further, the replacement chamber conveyor roller device 24 is disposed in a replacement chamber 62. In FIG. 2, the replacement chamber 62 is shown by a broken line. The replacement chamber 62 is configured to replace atmospheric gas with air.

The post-replacement chamber conveyor roller device 26 is disposed downstream of the replacement chamber conveyor roller device 24. The post-replacement chamber conveyor roller device 26 extends in the Y direction. The post-replacement chamber conveyor roller device 26 comprises rollers of which ends are rotatably supported (see FIG. 6). The objects 2 are conveyed by the rotating rollers, and move on the conveyance passage 26a of the post-replacement chamber conveyor roller device 26 in the conveyance direction D1 (−Y direction). Further, the post-replacement chamber conveyor roller device 26 conveys the objects 2 at the same speed as the conveyance speed at which the objects 2 are conveyed by the first turning device 22. The width of the conveyance passage 26a (dimension in the X direction) is substantially the same as the width W1 of the conveyance passage 22a of the first turning device 22.

As shown in FIG. 6, the second detector 27 is disposed in the vicinity of the post-replacement chamber conveyor roller device 26. For example, the second detector 27 may be disposed on the +X side or −X size of the post-replacement chamber conveyor roller device 26, and may be disposed on the +Z side of the post-replacement chamber conveyor roller device 26. The second detector 27 detects the positions of the objects 2 on the conveyance passage 26a of the post-replacement chamber conveyor roller device 26. The second detector 27 may for example be a CCD camera or a CMOS camera.

The separating roller device 28 is disposed downstream of the post-replacement chamber conveyor roller device 26. The separating roller device 28 comprises a first separating roller device 64 and a second separating roller device 66. The first separating roller device 64 and the second separating roller device 66 are lined in the X direction. The first separating roller device 64 and the second separating roller device 66 comprise rollers of which ends are rotatably supported (see FIG. 6). Each of the objects 2 is conveyed by the rotating rollers, and move either on the conveyance passage 64a of the first separating roller device 64 or on the conveyance passage 66a of the second separating roller device 66 in the conveyance direction D1 (−Y direction). Further, the first separating roller device 64 and the second separating roller device 66 convey the objects 2 at a speed that is equal to or greater than 1.5 times the conveyance speed at which the objects 2 are conveyed by the post-replacement chamber conveyor roller device 26 and equal to or less than 5 times the aforementioned conveyance speed. The rollers of the first separating roller device 64 and the rollers of the second separating roller device 66 operate independent from each other. The width of the conveyance passage 64a (dimension in the X direction) and the width of the conveyance passage 66a (dimension in the X direction) are each about half of the width W1 of the conveyance passage 22a of the first turning device 22.

The second stopper 30 is disposed downstream of the separating roller device 28 and upstream of the alignment stage roller device 32. The second stopper 30 comprises a second left stopper 68 and a second right stopper 70. The second left stopper 68 is disposed between the first separating roller device 64 and the alignment stage roller device 32. The second right stopper 70 is disposed between the second separating roller device 66 and the alignment stage roller device 32. The second left stopper 68 and the second right stopper 70 move in the +Z direction and he −Z direction between a pass-through prohibiting position and a pass-through permitting position. The second left stopper 68 and the second right stopper 70 operate independently. When the second left stopper 68 and the second right stopper 70 are positioned at the pass-through prohibiting position, the second left stopper 68 is arranged to close a path between the first separating roller device 64 and the alignment stage roller device 32 in the conveyance direction D1, and the second right stopper 70 is arranged to close a path between the second separating roller device 66 and the alignment stage roller device 32 in the conveyance direction D1. Due to this, the objects 2 contact one of the second left stopper 68 and the second right stopper 70, by which they stay on the conveyance passages 64a, 66a and cannot move from the separating roller device 28 to the alignment stage roller device 32. On the other hand, when the second left stopper 68 and the second right stopper 70 are located at the pass-through permitting position, the second left stopper 68 and the second right stopper 70 are arranged such that they are separated from both the separating roller device 28 and the alignment stage roller device 32 in the −Z direction. In this case, the second left stopper 68 does not close the path between the first separating roller device 64 and the alignment stage roller device 32 in the conveyance direction D1, and the second right stopper 70 does not close the path between the second separating roller device 66 and the alignment stage roller device 32 in the conveyance direction D1. Due to this, the objects 2 can move from the first separating roller device 64 to the alignment stage roller device 32 without coming into contact with the second left stopper 68, and can move from the second separating roller device 66 to the alignment stage roller device 32 without coming into contact with the second right stopper 70.

The alignment stage roller device 32 comprises a plurality of rollers that is rotatably supported. The objects 2 are conveyed by the rotating rollers, and move on a conveyance passage 32a of the alignment stage roller device 32 in the conveyance direction D1 (−Y direction). Further, the alignment stage roller device 32 conveys the objects 2 at the same speed as the conveyance speed at which the objects 2 are conveyed by the first turning device 22. A width of the conveyance passage 32a (dimension in the X direction) is substantially the same as the width W1 of the conveyance passage 22a of the first turning device 22.

The aligning device 34 is disposed such that the alignment stage roller device 32 is interposed between the aligning device 34 in its width direction (X direction). The aligning device 34 comprises a movable portion 74 and a fixed portion 76. The movable portion 74 is configured to move on the conveyance passage 32a of the alignment stage roller device 32 in the +X direction and the −X direction. The fixed portion 76 is disposed on the +X side from the movable portion 74. The fixed portion 76 is immobile.

The second turning entrance device 36 is disposed downstream of the alignment stage roller device 32. The second turning entrance device 36 comprises rollers which are rotatably supported. The objects 2 are conveyed by the rotating rollers, and move on a conveyance passage 36a of the second turning entrance device 36 in the conveyance direction D1 (−Y direction). Further, the second turning entrance device 36 conveys the objects 2 at the same speed as the conveyance speed at which the objects 2 are conveyed by the first turning device 22. The width of the conveyance passage 36a (dimension in the X direction) is substantially half the width W1 of the conveyance passage 22a of the first turning device 22.

The second turning device 38 is disposed downstream of the second turning entrance device 36. The second turning device 38 changes the conveyance direction D1 of the objects 2 from the −Y direction to the −X direction, which is perpendicular to the Y direction. Due to this, the conveyor 10 is suppressed from increasing in size in the Y direction. The width of a conveyance passage 38a (dimension in the Y direction) is substantially the same as the width of the conveyance passage 14a of the separating conveyor roller device 14 (dimension in the Y direction). Due to this, the conveyance passage 38a can have six objects 2 lined in a row along the width direction. In a variant, the width of the conveyance passage 38a may be different from the width of the conveyance passage 14a.

Further, the second turning device 38 comprises a plurality of first rollers of which ends are rotatably supported and a plurality of second rollers of which ends are rotatably supported.

The objects 2 are conveyed by the rotating first rollers and move on the conveyance passage 38a of the second turning device 38 in the −Y direction, and are further conveyed by the rotating second rollers and move on the conveyance passage 38a in the −X direction. Further, the second turning device 38 conveys the objects 2 at a speed lower than the separating speed in the high-speed unit 54. In a variant, the conveyance speed at which the objects 2 are conveyed by the second turning device 38 may be higher than the exiting speed at which the objects 2 exit from the heat treatment furnace 110.

The third detector 40 is disposed in the vicinity of a boundary between the second turning entrance device 36 and the second turning device 38. The third detector 40 is a transmissive photoelectronic sensor configured to emit a laser beam in the X direction. In a variant, the third detector 40 is not limited to the transmissive photoelectronic sensor, but may be a position sensor, a CCD sensor, or a CMOS sensor, for example. The third detector 40 is configured to detect whether the objects 2 are crossing over the boundary between the second turning entrance device 36 and the second turning device 38.

The fourth detector 41 is disposed in the vicinity of a distal end 38b of the second turning device 38 in the Y direction. The distal end 38b of the second turning device 38 corresponds to an end located farthest away from the second turning entrance device 36. The fourth detector 41 may for example be a transmissive photoelectronic sensor configured to emit a laser beam in the X direction. In a variant, the fourth detector 41 is not limited to the transmissive photoelectronic sensor, but may be a position sensor, a CCD sensor, or a CMOS sensor, for example. The fourth detector 41 is configured to detect whether the objects 2 are arranged at the vicinity of the distal end 38b of the second turning device 38.

The cooling conveyor roller device 42 is disposed downstream of the second turning device 38. The cooling conveyor roller device 42 comprises a plurality of rollers of which ends are rotatably supported. The objects 2 are conveyed by the rotating rollers, and move on a conveyance passage 42a of the cooling conveyor roller device 42 in the conveyance direction D1 (−X direction). Further, the cooling conveyor roller device 42 conveys the objects 2 at the same speed as the conveyance speed at which the objects 2 are conveyed by the second turning device 38. The width of the conveyance passage 42a (dimension in the Y direction) is substantially the same as the width of the conveyance passage 38a of the second turning device 38.

The cooling conveyor roller device 42 is disposed in a cooling chamber 90. In FIG. 6, the cooling chamber 90 is shown in a broken line. The cooling chamber 90 is configured to cool the objects 2 that have been subjected to heat treatment. The objects 2 are cooled as they move on the conveyance passage 42a.

Finally, the flow for conveying the objects 2 from the post-replacement chamber conveyor roller device 26 to the cooling conveyor roller device 42 will be described. The objects 2 conveyed by the replacement chamber conveyor roller device 24 move on the conveyance passage 26a of the post-replacement chamber conveyor roller device 26 in the −Y direction, and thereafter move to the separating roller device 28. When the objects 2 are located on the conveyance passage 26a on the +X side of the boundary between the first separating roller device 64 and the second separating roller device 66, the objects 2 move onto the conveyance passage 64a of the first separating roller device 64 and come into contact with the second left stopper 68. Further, when the objects 2 are located on the conveyance passage 26a on the −X side of the boundary between the first separating roller device 64 and the second separating roller device 66, the objects 2 move onto the conveyance passage 66a of the second separating roller device 66 and come into contact with the second right stopper 70. Further, the second detector 27 detects the positions of the objects 2 on the conveyance passage 26a by being controlled by the control unit 44. Specifically, the second detector 27 detects which one of the +X side and the −X side of the boundary between the first separating roller device 64 and the second separating roller device 66 the objects 2 are located. Detection results from the second detector 27 are sent to the control unit 44. Hereinbelow, a case in which two objects 2 are lined along the X direction and one of the objects 2 moves to the first separating roller device 64 and the other of the objects 2 move to the second separating roller device 66 will be described.

Firstly, the control unit 44 moves the second left stopper 68 from the pass-through prohibiting position to the pass-through permitting position and rotates the rollers of the first separating roller device 64. Due to this, the one of the objects 2 move onto the conveyance passage 32a of the alignment stage roller device 32. Then, the control unit 44 moves the movable portion 74 in the +X direction toward the fixed portion 76, and thereafter moves the same in the −X direction to return to its initial position. Due to this, the one of the objects 2 is interposed between the movable portion 74 and the fixed portion 76, and the orientation of the one object 2 is adjusted to a predetermined orientation. While the movable portion 74 moves, the second left stopper 68 returns to the pass-through prohibiting position from the pass-through permitting position. Then, the control unit 44 rotates the rollers of the alignment stage roller device 32 and the rollers of the second turning entrance device 36. Due to this, the one of the objects 2 moves in the −Y direction on the conveyance passage 32a of the alignment stage roller device 32 and the conveyance passage 36a of the second turning entrance device 36 in this order.

Then, the control unit 44 moves the second right stopper 70 from the pass-through prohibiting position to the pass-through permitting position, and rotates the rollers of the second separating roller device 66. Due to this, the other object 2 moves onto the conveyance passage 32a of the alignment stage roller device 32. Then, the control unit 44 moves the movable portion 74 in the +X direction toward the fixed portion 76, and thereafter move it in the −X direction to return it to its initial position. Due to this, the other object 2 moves in the +X direction from the front of the second right stopper 70 to the front of the second left stopper 68, is thereafter clamped between the movable portion 74 and the fixed portion 76, and the orientation of the other object 2 is adjusted to a predetermined orientation. While the movable portion 74 is moving, the second right stopper 70 returns to the pass-through prohibiting position from the pass-through permitting position. Then, the control unit 44 rotates the rollers of the alignment stage roller device 32, the rollers of the second turning entrance device 36, and the first rollers of the second turning device 38. Due to this, the other object 2 moves in the −Y direction on the conveyance passage 32*a* of the alignment stage roller device 32, the conveyance passage 36*a* of the second turning entrance device 36, and the conveyance passage 38*a* of the second turning device 38 in this order.

While the objects 2 are moving, the third detector 40 is controlled by the control unit 44 to detect whether the objects 2 have finished moving onto the conveyance passage 38*a* of the second turning device 38. Detection results from the third detector 40 are sent to the control unit 44. Due to the control unit 44 repeating the moving process of moving the objects 2 from the second turning entrance device 36 to the second turning device 38 based on the received detection results, the objects 2 are thereby placed on the conveyance passage 38*a* of the second turning device 38. Further, the objects 2 that first moved to the second turning device 38 gradually move toward the distal end 38*b* of the second turning device 38 by the moving process being repeated.

The fourth detector 41 detects whether the objects 2 are arranged in the vicinity of the distal end 38*b* of the second turning device 38. When the objects 2 are arranged in the vicinity of the distal end 38*b* of the second turning device 38, this results in six objects 2 placed on the conveyance passage 38*a* of the second turning device 38. Detection results from the fourth detector 41 are sent to the control unit 44. In determining that the objects 2 are arranged in the vicinity of the distal end 38*b* of the second turning device 38, the control unit 44 rotates the second rollers of the second turning device 38. Due to this, the six objects 2 move in the −X direction and move from the conveyance passage 38*a* of the second turning device 38 to the conveyance passage 42*a* of the cooling conveyor roller device 42. The six objects 2 are cooled while they move on the conveyance passage 42*a*.

Effects

The conveyor 10 of the present embodiment successively conveys six (an example of "predetermined number") objects 2 lined in the row direction D2 to the heat treatment furnace 110 in the state where the objects 2 are arranged at a predetermined interval from one another in the conveyance direction D1, and conveys the objects 2 heat-treated in the heat treatment furnace 110 out of the heat treatment furnace 110. The conveyor 10 comprises the separating conveyor roller device 14 (an example of "first conveyor roller device") configured to convey the objects 2 conveyed out of the heat treatment furnace 110 in the conveyance direction D1 at the speed higher than the exiting speed at which the objects 2 exit from the heat treatment furnace 110, the replacement chamber conveyor roller device 24 (an example of "second conveyor roller device") disposed downstream of the separating conveyor roller device 14, and the first stopper 18 (an example of "stopper") disposed downstream of the separating conveyor roller device 14 and upstream of the replacement chamber conveyor roller device 24 and configured to prohibit the movement of the objects 2 in the conveyance direction D1. The separating conveyor roller device 14 increases the interval between the objects 2 in the conveyance direction D1 to be wider than the interval between the objects 2 in the conveyance direction D1 when the objects 2 exit from the heat treatment furnace 110 so that the objects 2 are separated into the object groups GP1, GP2 (examples of "object groups") including six objects 2 or less.

According to the above configuration, even if the objects 2 exit from the heat treatment furnace 110 in the state where the positional relationship of the objects 2 in the conveyance direction D1 is significantly disturbed, the separating conveyor roller device 14 conveys the objects 2 at the speed higher than the exiting speed, thus the interval between the objects 2 in the conveyance direction D1 thereby increases. That is, the interval in the conveyance direction D1 between the objects 2 that exited first and the objects 2 that exited thereafter increases. Due to this, even if the object group GP1 that exited first is prohibited from moving in the conveyance direction D1 by the first stopper 18, it is possible to suppress elimination of the interval between the object group GP1 that exited first and the object group GP2 that exited thereafter. As a result, the object groups GP1, GP2 that are adjacent to each other in the conveyance direction D1 can easily be separated by the first stopper 18, thus the objects 2 can stably be conveyed toward the replacement chamber conveyor roller device 24.

(Corresponding Relationship)

In this embodiment, the alignment stage roller device 32, the aligning device 34, and the second turning entrance device 36 correspond to "aligning device".

Second Embodiment

A second embodiment will be described with reference to FIG. 7. In the second embodiment, only the points that differ from the first embodiment will be described. In the second embodiment, the conveyor 10 does not comprise the alignment stage roller device 32 or the aligning device 34 of the first embodiment. Further, in the second embodiment, the second stopper 30 is not separated into the second left stopper 68 and the second right stopper 70. The second stopper 30 is immobile. The second stopper is fixed to the pass-through prohibiting position. The second stopper 30 suppresses the objects 2 from falling off the separating roller device 28.

In the second embodiment, the objects 2 move in both the −Y direction and the +X direction on the conveyance passage 66*a* by the rotating rollers of the second separating roller device 66. Due to this, when the objects 2 are on the conveyance passage 66*a* of the second separating roller device 66, they move from the conveyance passage 66*a* to the conveyance passage 64*a* of the first separating roller device 64 by the rotation of the rollers.

In the second embodiment, the conveyor 10 comprises an aligning device 174. The aligning device 174 moves the objects 2 on the conveyance passage 64*a* of the first separating roller device 64 onto the conveyance passage 36*a* of the second turning entrance device 36. The aligning device 174 comprises a clamping portion 176 and a sliding portion 178. The clamping portion 176 can clamp one or more objects 2. The clamping portion 176 may include a pair of arms for clamping the objects 2, for example. The clamping portion 176 is rotatably attached to the sliding portion 178. The clamping portion 176 is configured to adjust the orientation of the object(s) 2 to a predetermined orientation by pivoting relative to the sliding portion 178 while clamping the object(s) 2. Further, the clamping portion 176 is attached to the sliding portion 178 such that it is movable in the Z direction. The sliding portion 178 is movable in the X direction and the Y direction.

Next, operation of the aligning device 174 will be described. Firstly, the control unit 44 moves the sliding portion 178 to directly above the objects 2 on the conveyance passage 64*a* of the first separating roller device 64. Then, the control unit 44 pivots the clamping portion 176 according to the orientation of the objects 2 based on the detection result of a detector (not shown, a CCD camera or a CMOS camera, for example) attached to the sliding portion 178. Then, the control unit 44 moves the clamping portion 176 in the −Z direction. Next, the control unit 44 closes the pair of arms of the clamping portion 176. Due to this, the object(s) 2 are clamped by the clamping portion 176. Next, the control unit 44 moves the clamping portion 176 in the +Z direction, moves the sliding portion 178 in the −Y direction, and moves the clamping portion 176 in the −Z direction in this order. Due to this, the object(s) 2 move over the second stopper 30 and onto the conveyance passage 36*a* of the second turning entrance device 36. The control unit 44 pivots the clamping portion 176 to a predetermined position while the sliding portion 178 moves. Due to this, the orientation of the object(s) 2 is adjusted to a predetermined orientation. Finally, the control unit 44 opens the pair of arms of the clamping portion 176. Due to this, the object(s) 2 are placed on the conveyance passage 36*a* of the second turning entrance device 36.

(Corresponding Relationship)

In this embodiment, the separating roller device 28, the second turning entrance device 36, and the aligning device 174 are examples of "aligning device".

Third Embodiment

A third embodiment will be described with reference to FIG. 8. In the third embodiment, only the points that differ from the first embodiment will be described. In the third embodiment, the conveyor 10 does not comprise the second detector 27, the second stopper 30, the alignment stage roller device 32, the aligning device 34, the second turning entrance device 36, the second turning device 38, or the third detector 40 of the first embodiment. Further, in the third embodiment, the separating roller device 28 is not separated into the first separating roller device 64 and the second separating roller device 66.

In the third embodiment, the conveyor 10 comprises a cooling conveyor roller device entrance unit 238 and an aligning device 274. The cooling conveyor roller device entrance unit 238 is disposed upstream of (in the +X direction from) the cooling conveyor roller device 42. The cooling conveyor roller device entrance unit 238 comprises a plurality of rollers of which ends are rotatably supported. The objects 2 are conveyed by the rotating rollers, and move on a conveyance passage 238*a* of the cooling conveyor roller device entrance unit 238 in the conveyance direction D1 (−X direction). The width of the conveyance passage 238*a* (dimension in the Y direction) is substantially same as the width of the conveyance passage 42*a* of the cooling conveyor roller device 42.

The aligning device 274 is disposed on the −Y direction side from the separating roller device 28 and on the +X direction side from the cooling conveyor roller device entrance unit 238. The aligning device 274 is disposed separately from the separating roller device 28 and the cooling conveyor roller device entrance unit 238.

The aligning device 274 comprises a base 276 and an arm 278. The base end of the arm 278 is attached to the base 276 so as to be rotatable about a rotation axis RX. The arm 278 includes a chuck (not shown), which is located at the distal end of the arm 278 and configured to hold one or more objects 2.

The fourth detector 41 is disposed in the vicinity of the proximal end 238*b* of the cooling conveyor roller device entrance unit 238 in the Y direction. The proximal end 238*b* of the cooling conveyor roller device entrance unit 238 corresponds to an end located closest to the separating roller device 28. The fourth detector 41 detects whether the objects 2 are arranged in the vicinity of the proximal end 238*b* of the cooling conveyor roller device entrance unit 238.

Operation of the aligning device 274 will be described. The control unit 44 pivots the arm 278 about the rotation axis RX toward the separating roller device 28 so that the distal end of the arm 278 is located directly above the object(s) 2 on the separating roller device 28. Then, the control unit 44 pivots the chuck in accordance with the orientation of the object(s) 2 based on the detection result of the detector (not shown, a CCD camera or a CMOS camera, for example) attached to the distal end of the arm 278. Then, the control unit 44 operates the chuck. Due to this, the object(s) 2 are held by the arm 278. Then, the control unit 44 pivots the arm 278 about the rotation axis RX toward the cooling conveyor roller device entrance unit 238 so that the distal end of the arm 278 is located at a predetermined position on the conveyance passage 238*a* of the cooling conveyor roller device entrance unit 238. Finally, the control unit 44 operates the chuck of the arm 278. Due to this, the object(s) 2 are placed on the conveyance passage 238*a* of the cooling conveyor roller device entrance unit 238. In FIG. 8, an object 2 that was released from the chuck and the arm 278 are shown by broken lines. When the aforementioned operation by the aligning device 274 is repeated, six objects 2 are lined on the conveyance passage 238*a* in the width direction (Y direction). Further, when the aforementioned operation by the aligning device 274 is repeated, the six objects 2 are lined in order from the distal end of the cooling conveyor roller device entrance unit 238 toward the proximal end 238*b* thereof. The distal end of the cooling conveyor roller device entrance unit 238 is an end on the opposite side from the proximal end 238*b*.

When the six objects 2 are placed on the conveyance passage 238*a*, one of the objects 2 is arranged close to the proximal end 238*b* of the cooling conveyor roller device entrance unit 238. When the control unit 44 determines that the object 2 is arranged close to the proximal end 238*b* of the cooling conveyor roller device entrance unit 238, it rotates the rollers of the cooling conveyor roller device entrance unit 238. Due to this, the six objects 2 move in the −X direction and move from the conveyance passage 238*a* of the cooling conveyor roller device entrance unit 238 onto the conveyance passage 42*a* of the cooling conveyor roller device 42.

(Corresponding Relationship)

In this embodiment, the aligning device 274 is an example of "aligning device".

Fourth Embodiment

A fourth embodiment will be described with reference to FIG. 9. In the fourth embodiment, only the points that differ from the first embodiment will be described. In the fourth embodiment, arrangements of the components of the conveyor 10 differ from the arrangements of the components of the conveyor 10 in the first embodiment.

In the fourth embodiment, the replacement chamber conveyor roller device 24 is disposed downstream of the first stopper 18 and upstream of the first turning device 22. Due to this, the objects 2 are conveyed from the pre-stopper conveyor roller device 16 to the replacement chamber conveyor roller device 24. The objects 2 move on the conveyance passage 24a of the replacement chamber conveyor roller device 24 in the +X direction (conveyance direction D1). After this, the objects 2 are conveyed from the replacement chamber conveyor roller device 24 to the first turning device 22.

Further, the post-replacement chamber conveyor roller device 26 is disposed downstream of the first turning device 22. Due to this, the objects 2 are conveyed from the first turning device 22 to the post-replacement chamber conveyor roller device 26.

(Variants)

In an embodiment, when the control unit 44 detects that the laser beam is received by the light receiver 20b over a predetermined period of time (such as for 1 second, 2 seconds, or 3 seconds), the control unit 44 may classify the objects 2 that passed through between the light emitter 20a and the light receiver 20b while the laser beam was not received by the light receiver 20b as one object group.

In an embodiment, the speed increasing unit 52 may comprise only one of the first speed increasing unit 56 and the second speed increasing unit 58.

In an embodiment, the separating conveyor roller device 14 may not comprise the speed increasing unit 52.

In the above embodiments, the width W1 of the conveyance passage 22a of the first turning device 22 may be greater than 3 times the width W2 of each of the objects 2 in the longitudinal direction. In this case, three or more objects 2 may be arranged in a line along the X direction on the conveyance passage 22a. In this configuration, the second stopper 30 may comprise a plurality of stoppers, and the number of the stopers may be equal to the number of objects 2 that are arranged in a line along the X direction on the conveyance passage 22a.

In an embodiment, when the objects 2 move from the second turning entrance device 36 to the second turning device 38, how the rollers of the second turning entrance device 36 operate and how the first rollers of the second turning device 38 operate are not limited to those illustrated in the embodiments. For example, the control unit 44 may stop the rollers of the second turning entrance device 36 and the first rollers of the second turning device 38 when it determines based on the detection result from the third detector 40 that the objects 2 are not crossing over the boundary between the second turning entrance device 36 and the second turning device 38 (that is, the objects 2 have finished crossing over the boundary). At this occasion, the objects 2 stop on the conveyance passage 38a of the second turning device 38.

In an embodiment, the conveyor 10 may comprise a plurality of fourth detectors 41. In this case, the number of the fourth detector 41 may be same as the number of objects 2 arranged along the Y direction on the conveyance passage 38a of the second turning device 38 or on the conveyance passage 238a of the cooling conveyor roller device entrance unit 238. In this configuration, the fourth detectors 41 may detect whether the objects 2 are arranged at their predetermined positions.

Specific examples of the disclosure herein have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the purpose of the examples illustrated by the present description or drawings is to satisfy multiple objectives simultaneously, and satisfying any one of those objectives gives technical utility to the present disclosure.

What is claimed is:

1. A conveyor configured to successively convey a predetermined number of objects lined in a row direction perpendicular to a conveyance direction into a heat treatment furnace in a state where the objects are arranged at a predetermined interval from one another in the conveyance direction, and convey the objects heat-treated in the heat treatment furnace out of the heat treatment furnace, the conveyor comprising:

a first conveyor roller device configured to convey the objects conveyed out of the heat treatment furnace in the conveyance direction at a speed higher than an exiting speed at which the objects exit from the heat treatment furnace;

a second conveyor roller device disposed downstream of the first conveyor roller device; and a stopper disposed downstream of the first conveyor roller device and upstream of the second conveyor roller device and configured to prohibit a movement of the objects in the conveyance direction, wherein the first conveyor roller device is configured to convey the objects lined in the row direction at a same speed and increase the interval between the objects in the conveyance direction to be wider than the interval between the objects in the conveyance direction when the objects exit from the heat treatment furnace so that the objects are separated into object groups each including less than the predetermined number of objects, and the stopper is configured to be disposed between the object groups separated by the first conveyor roller device and adjacent to each other in the conveyance direction.

2. The conveyor according to claim 1, wherein the first conveyor roller device comprises:

a high-speed unit configured to convey the objects at a separating speed higher than the exiting speed; and a speed increasing unit configured to increase a conveyance speed of the objects from the exiting speed to the separating speed.

3. The conveyor according to claim 2, wherein the speed increasing unit comprises:

a first speed increasing unit configured to convey the objects at a first speed higher than the exiting speed and lower than the separating speed; and a second speed increasing unit configured to convey the objects at a second speed higher than the first speed and lower than the separating speed.

4. The conveyor according to claim 2, further comprising:

a detector configured to detect an arrangement of the objects on the high-speed unit of the first conveyor roller device; and a control unit configured to classify the objects into a first object group and a second object group based on a detection result provided by the detector, wherein the control unit is configured to operate the stopper based on a classification result of the first object group and the second object group to dispose the stopper between the first object group and the second object group.

5. The conveyor according to claim 4, wherein the detector is a transmissive photoelectronic sensor configured to emit a laser beam in the row direction.

6. The conveyor according to claim 1, wherein the first conveyor roller device is disposed in a hood filled with atmospheric gas, and the second conveyor roller device is disposed in a replacement chamber which replaces the atmospheric gas with air.

7. The conveyor according to claim 1, further comprising a first turning device disposed downstream of the stopper and configured to change the conveyance direction from a first direction to a second direction substantially perpendicular to the first direction.

8. The conveyor according to claim 7, wherein the first turning device comprises a conveyance passage on which two objects can be arranged in the first direction and on which the objects are conveyed in the second direction.

9. The conveyor according to claim 8, wherein a width of the conveyance passage in the first direction is equal to or less than three times a width of each of the objects in a longitudinal direction.

10. The conveyor according to claim 7, further comprising:

a second turning device disposed downstream of the first turning device and configured to change the conveyance direction from the second direction to a third direction, the third direction being perpendicular to the second direction and opposite to the first direction; and an aligning device configured to align the objects in the second direction on a conveyance passage of the second turning device.

* * * * *